Feb. 14, 1933.   F. A. BOWER   1,897,788
OIL PRESSURE REGULATOR
Filed Dec. 29, 1926

Inventor
Ferdinand A. Bower
By Blackmore, Spencer & Hulse
Attorneys

Patented Feb. 14, 1933

1,897,788

UNITED STATES PATENT OFFICE

FERDINAND A. BOWER, OF FLINT, MICHIGAN, ASSIGNOR TO GENERAL MOTORS CORPORATION, OF DETROIT, MICHIGAN, A CORPORATION OF DELAWARE

OIL PRESSURE REGULATOR

Application filed December 29, 1926. Serial No. 157,858.

I have found that in present day automobile engines provided with force feed lubricating systems, a knock sometimes developes in the oil pump as a result of fluctuations in pressure in the oil line. These fluctuations may result from a number of causes. Thus in the Buick engine which is provided with metering holes in the connecting rod bearings for the discharge of oil upon the cylinder walls I have found that at certain speeds fluctuations in oil line pressure are produced by the effect of centrifugal action on the discharge of oil through the metering holes. These variations in oil line pressure may be likened to the throbbing of a pulse and produce knocking in the oil pump.

I have found it possible to eliminate this knock by the simple expedient of providing a pressure regulator in the lubricating system preferably between the pump and the parts to be lubricated. This regulator may be of any desired type such as a spring urged piston, a diaphragm or the like. I have found it most convenient to employ a resilient metallic bellows of the type known under the trade name of Sylphon. When this, or a similar device is placed in the lubricating system as described, variations in pressure in the line produce expansion and contraction of the regulator, but the variations are absorbed without being transmitted to the pump. As the pump works at all times against a substantially constant pressure or head, the knocking is eliminated.

Figure 1:
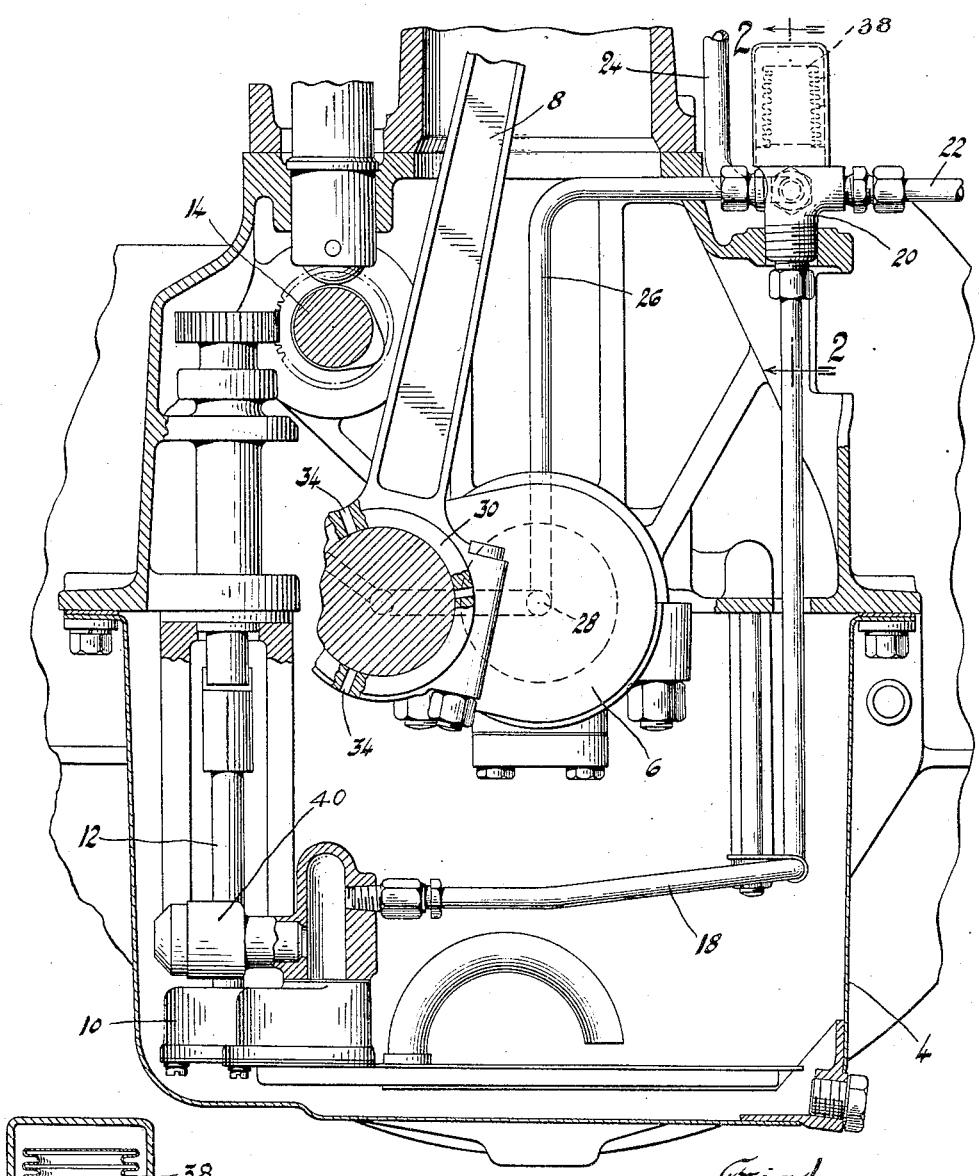
Fig. 1 is a sectional view through a portion of an automobile engine showing my equalizer applied to the lubricating system.
Figure 2:
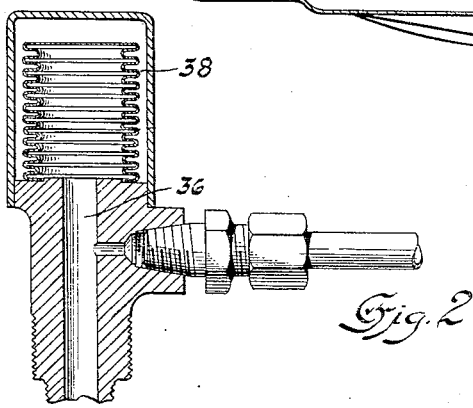
Fig. 2 is a section on line 2—2 of Fig. 1.

The engine shown in Fig. 1 is of the well known Buick design. It includes crank case 4 in which crank shaft 6 is housed, the crank shaft being connected with the pistons not shown, by the usual connecting rods 8. Oil pump 10 is driven by vertical shaft 12 which is in turn driven from the cam shaft 14 by suitable gearing. Pump 10 receives its supply of oil from the crank case, which serves as a lubricant reservoir. The oil thus drawn from the crank case is supplied through conduit 18 to the valve mechanism, cam shaft, crank shaft and other parts requiring lubrication. For the sake of better illustrating the principles of this invention, I have not shown the exact arrangement of the Buick lubricating system, but have merely shown sufficient portions thereof to illustrate the application of my invention thereto. Thus the conduit 18 leads to a fitting 20 from which conduit 22 leads to the usual oil gage mounted on the dash. From this same fitting I have shown conduit 24 leading to the oil distributor and conduit 26 leading to the crank shaft. This shaft is drilled as at 28 to conduct oil to the big ends of the connecting rods shown at 30. The connecting rod bearings are provided with metered openings 34 for the discharge of oil about the crank case and particularly upon the cylinder walls for lubricating the pistons. At 40 I have indicated the conventional pressure relief valve which opens when the pump pressure reaches a certain value, preventing injury to the system from excessive pressures.

With the system as thus described I have found that at certain speeds owing to centrifugal action oil is projected outwardly through the openings 34 in such amount and at such a rate as to cause variations in pressure in the oil line and cause a knock in the oil pump. To overcome this I have provided fitting 20 with a passage 36 leading to a pressure regulator 38. While various types of pressure regulators may be employed, I have preferred to make use of an expansible metallic bellows 38 of the type commonly known as sylphon bellows.

When now the crank shaft reaches a speed of rotation at which the discharge of oil through passages 34 is so variable as to cause a knock in the pump, were the pressure regulator not employed, the bellows 38 merely takes up the variations in line pressure by alternate contraction and expansion. The result is that the fluctuations are not transmitted to the pump and the operation of the latter is not disturbed. By this means I have found that the knock is entirely eliminated.

I claim:

1. In a pressure lubricating system for internal combustion engines for automobiles adapted to be driven at relatively high speeds, a pump for supplying oil under pressure to the parts to be lubricated certain of said parts rotating at relatively high speeds and producing variations in the oil line pressure as the result of centrifugal action, whereby at certain speeds knocking tends to be produced in the pump and pressure equalizing chamber arranged on the discharge side of said pump for smoothing out said pressure variations and preventing such knocking.

2. The combination as defined in claim 1, said pressure equalizing chamber comprising a yieldingly expansible chamber.

3. An internal combustion engine for use on automobiles and adapted to be driven at relatively high speeds, said engine having a crank shaft and cylinders, means for supplying lubricant to the moving parts of the engine comprising a continuous feed pump, conduits leading from the pump to said parts including passages leading to the crank shaft throws for the projection of lubricant upon the cylinder walls whereby at certain speeds knocking tends to be produced in the pump, and a pressure regulator arranged between said pump and said parts for smoothing out variations in pressure in the system and preventing such knocking.

4. An internal combustion engine for automobiles adapted to be driven at relatively high speeds, said engine having parts to be lubricated and a circulating lubricating system therefor comprising a continuous feed rotary pump consisting of intermeshing gears for forcing lubricant through the system to the parts, certain of said parts rotating at high speeds and having lubricant passages therein whereby variations in oil line pressure are produced as a result of centrifugal action, and a pressure equalizing chamber interposed between the pump and the bearings for smoothing out variations in oil line pressure and preventing knocking at the pump.

5. In an internal combustion engine, a continuous feed rotary lubricating pump, a crankshaft, a passage in the crankshaft, a passage from the pump to the passage in the crankshaft, cranks on the crankshaft, a passage in each crank communicating with the passage in the crankshaft, bearings on the cranks adapted to receive lubricant from the passages and to spray the lubricant whereby at high speeds as the result of centrifugal force, knocking is produced in the pump, and means for preventing such knocking consisting of a pressure equalizing chamber interposed between the pump and the bearings.

In testimony whereof I affix my signature.

FERDINAND A. BOWER.